United States Patent
Nempont et al.

(10) Patent No.: US 10,410,342 B2
(45) Date of Patent: Sep. 10, 2019

(54) DEVICE-BASED MOTION-COMPENSATED DIGITAL SUBTRACTION ANGIOGRAPHY

(71) Applicant: KONINKLIJKE PHILIPS N.V., Eindhoven (NL)

(72) Inventors: Olivier Pierre Nempont, Suresnes (FR); Markus Johannes Harmen Den Hartog, Eindhoven (NL); Rami Nachabe, Cincinnati, OH (US); Guillaume Julien Joseph Pizaine, Issy-les-Moulineaux (FR); Alessandro Guido Radaelli, Oirschot (NL); Raoul Florent, Ville d'Avray (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 23 days.

(21) Appl. No.: 15/531,991

(22) PCT Filed: Nov. 25, 2015

(86) PCT No.: PCT/EP2015/077576
§ 371 (c)(1),
(2) Date: May 31, 2017

(87) PCT Pub. No.: WO2016/087271
PCT Pub. Date: Jun. 9, 2016

(65) Prior Publication Data
US 2017/0345145 A1  Nov. 30, 2017

(30) Foreign Application Priority Data

Dec. 3, 2014 (EP) .................................... 14306941

(51) Int. Cl.
*A61B 6/00* (2006.01)
*G06T 7/00* (2017.01)
(Continued)

(52) U.S. Cl.
CPC .............. *G06T 7/0012* (2013.01); *G06T 7/11* (2017.01); *G06T 7/246* (2017.01); *G06T 7/254* (2017.01);
(Continued)

(58) Field of Classification Search
CPC ..................................... G06T 7/00; A61B 6/00
(Continued)

(56) References Cited

U.S. PATENT DOCUMENTS 4,729,379 A * 3/1988 Ohe ....................... A61B 6/481
 348/E5.089
2007/0167747 A1  7/2007 Borgert
(Continued)

OTHER PUBLICATIONS

Ma, YingLiang et al "Clinical Evaluation of Respiratory Motion Compensation for Anatomical ROadmap Guided cardiac Electrophysiology Procedures" IEEE Transactions on Biomedical Engineering, vol. 59, No. 1, Jan. 2012, pp. 122-131.
(Continued)

*Primary Examiner* — Abolfazl Tabatabai

(57) ABSTRACT

An image processing method and related system to register projection images (AG, MI) only with respect to a motion of a landmark across said images. The motion of the landmark relates to a motion of a region of interest, ROI. The so registered images (AG, MI) are then subtracted from each other to arrive at a difference image that is locally motion compensated and that represents the ROI at good contrast while subtraction artifacts can be avoided.

15 Claims, 5 Drawing Sheets

(51) Int. Cl.
    G06T 7/246    (2017.01)
    G06T 7/254    (2017.01)
    G06T 7/11     (2017.01)
    G06T 11/00    (2006.01)
    A61K 49/04    (2006.01)

(52) U.S. Cl.
    CPC .. G06T 11/006 (2013.01); *G06T 2207/10121* (2013.01); *G06T 2207/20224* (2013.01); *G06T 2207/30021* (2013.01); *G06T 2207/30048* (2013.01); *G06T 2211/404* (2013.01); *G06T 2211/428* (2013.01)

(58) Field of Classification Search
    USPC .................................. 382/128–134; 424/9.4
    See application file for complete search history.

(56) References Cited

U.S. PATENT DOCUMENTS

2010/0329523 A1    12/2010    Ostermeier
2012/0283556 A1    11/2012    Ferschel
2013/0190615 A1    7/2013     Royalty
2013/0261431 A1    10/2013    Amberg

OTHER PUBLICATIONS

Meijering, Eric H.W. et al "Retrospective Motion Correction in Digital Substraction Angiography: A Review", IEEE Transactions on Medical Imaging, vol. 18, No. 1, Jan. 1999.

Atasoy, Selen et al "Real-Time Respiratory Motion Tracking: Roadmap Correction for Hepatic Artery Catheterizations", Proceedings of SPIE, vol. 6918, Mar. 2008.

Groher, Martin et al "3D Guide Wire Navigation from Single Plane Fluoroscopic Images in Abdominal Catheterizations", Jan. 2009.

Abdel-Wahab, Mohamed et al "Aortic regurgitation after transcatheter aortic valve implantation: incidence and early outcome. Results from the German transcatheter aortic valve interventions registry", Heart, 2011, pp. 899-906.

Cribier, Alain "Percutaneous Implantation of Aortic Valve Prostheses in Patients with Calcific Aortic", Interventioal Cardiology, Oct. 2007.

* cited by examiner

A

B

C

DEVICE-BASED MOTION-COMPENSATED DIGITAL SUBTRACTION ANGIOGRAPHY

CROSS-REFERENCE TO PRIOR APPLICATIONS

This application is the U.S. National Phase application under 35 U.S.C. § 371 of International Application No. PCT/EP2015/077576, filed on Nov. 25, 2015, which claims the benefit of European Patent Application No. 14306941.7, filed on Dec. 3, 2014. These applications are hereby incorporated by reference herein.

FIELD OF THE INVENTION

The invention relates to an image processing method, to an image processing system, to a computer program element and to a computer readable medium.

BACKGROUND OF THE INVENTION

There are a number of medical interventions that are carried under fluoroscopy or angiography. In other words, real-time projection X-ray images are acquired to image the internals of the patient along with medical tools or devices introduced into the patient to achieve the intervention.

For example, in order to stem growth of cancerous tissue or of an AVM (arteriovenous malformation) its arterial feeders may be intentionally embolized to shut down the blood supply (AVM) and/or stop nutrient supply to the cancer or growth (such as in transcatheter arterial chemoembolization (TACE)). This type of intervention, called medical embolization, may be brought about by administering an embolization agent at a desired location (region of interest (ROI)) in the human body by way of a catheter tube. The embolization agent is essentially a liquid volume or mass of glue comprising small beads suspended in a carrier liquid through which the occlusion at the diseased location effected. During such embolization interventions it is pre-eminent to ensure that it is only the targeted arterial feeders that are blocked off but sound vessels are not. At present the position of emboli is monitored by acquiring one or more fluoroscopic projection images. Because of radiation opacity of the embolus and/or of the carrier fluid, projective "footprints" are discernible in said fluoroscopic images thereby providing clues to an interventionist radiological about the embolus' whereabouts.

Another example for an intervention that relies on image based support is Transcatheter Aortic Valve Implantation (TAVI). To evaluate the outcome of a TAVI procedure, a visual evaluation of valvular regurgitations is routinely performed using angiography. An injection of contrast agent is performed. The interventionist then visually examines angiogram frames for whether there is contrast agent back flow into the left ventricle to so determine a severity of the regurgitation (based on the amount of contrast in the ventricle, the proportion of the ventricle filled with contrast, etc.).

In the above two exemplary interventions and also in others, the image quality is often compromised by poor contrast in one or more motion layers viewed against a complex and cluttered background (spine, ribs, medical devices, etc.). In an attempt to improve the situation, Digital Subtraction Angiography (DSA) is sometimes used to achieve better image contrast. In traditional DSA, a mask image is subtracted from a contrast image (e.g. the angiogram or a fluoroscopic frame that captures the embolus, etc.). However due to complex motion patterns during the intervention, subtraction artifacts may be introduced by DSA which again undermines image quality.

SUMMARY OF THE INVENTION

There may therefore be a need in the art for an alternative image processing methods and/or related apparatuses that address at least some of the deficiencies noted above.

The object of the present invention is solved by the subject matter of the independent claims where further embodiments are incorporated in the dependent claims. It should be noted that the following described aspect of the invention equally applies to the image processing method, the image processing system, to the computer program element and to the computer readable medium.

According to a first aspect of the invention there is provided an image processing system, comprising:

an input port configured to receive at least two projection images including at least one mask image and at least one contrast image of at least part of a specimen with an object therein, the mask image and the contrast image acquired at different acquisition times and each representing a region of interest, ROI, at different contrasts;

a landmark identifier configured to identify at least one landmark of said object in the contrast image and in the at least one mask image;

a motion estimator configured to estimate a motion of the object as per a motion of the identified at least one landmark across the at least contrast image and the at least one mask image, wherein said motion relates to a motion of the ROI;

a motion compensator configured to register the at least one mask image with the at least one contrast image based only on the estimated landmark motion;

a subtractor configured to subtract the at least one registered mask image from the at least one contrast image to obtain a difference image of the ROI; and an output port configured to output the difference image.

According to one embodiment, the image processing system comprises a visualizer configured to display on a display device at least a part of said difference image that corresponds to the ROI.

In other words, the proposed method implements a ROI-motion compensated DSA that is focused on the motion of the ROI. More particularly, the motion of the ROI is obtained by tracking a landmark either inside or outside an image portion that represents the ROI and only this landmark motion is taken into account to account to compensate for a motion of the ROI. In yet other words, the motion compensation is based only on the landmark motion. Other motions of surrounding image objects are ignored. Although objects subject to different motions than the landmark motion may appear therefore occasionally as blurred, this has been discovered by Applicant to be actually an asset as this blurring affords the operator to easier mentally focus on the high contrast image information in the ROI that stand our better to the eye against the (possibly) blurry background. This is particularly advantageous if the proposed method is issued to visualize imagery in real-time to support demanding interventions where the operator has to negotiate complex anatomy and motion patterns.

According to one embodiment, the landmark identification is based on auxiliary image data registered with at least one of the projection images.

According to one embodiment, the landmark is subject to a first motion, wherein the motion compensator's registering operation includes selecting the mask image so that a position of the landmark as per the selected mask image corresponds to a position of the landmark as per the at least one contrast image.

According to one embodiment, the image processing system comprises a landmark specification input port and the identifier operates to identify the landmark in response to receiving at said input port a specification of the landmark or of multiple landmarks, the specification being a selection from the mask image or from the contrast image.

According to one embodiment, the visualizer is configured to effect display on the display device of the at least part of the difference image together with the mask image and/or the contrast image. In one embodiment, only as section of the difference image is displayed that is the section is "ROI focused".

According to one embodiment, the visualizer is configured to display at least part of the registered auxiliary image data.

According to one embodiment, the system is configured to process the at least two projection images in respect of a second landmark and/or second ROI to obtain a second difference image wherein the visualizer is configured to display at least a part of said second difference image instead of or together with the difference image.

According to one embodiment, the visualizer is configured to display in the mask image, a graphical overlay indicating a location of the ROI and/or of the second ROI.

According to one embodiment, the landmark is subject to a second motion, wherein the motion compensator is configured to:

select two additional mask images so that i) the landmark's positions due to the first motion as per the two additional mask projection images are substantially the same and ii) a position difference in respect of the second motion is substantially the same as for the landmark as per the mask image and as per the at least one contrast image.

According to one embodiment, the subtractor is configured to:

subtract said two additional mask images to obtain a mask difference image, after motion compensation in respect of the first or second motion, subtract the mask difference image from the difference image to obtain a cascaded difference image.

According to one embodiment, the visualizer configured to display on a screen at least a part of said cascaded difference image.

According to one embodiment, the landmark is or relates to a projection footprint of a native object or to a foreign object, in particular an implanted object such as an artificial heart valve or an embolus. The object is resident in the specimen at respective acquisition times of the mask projection image and the projection image.

BRIEF DESCRIPTION OF THE DRAWINGS

Exemplary embodiments of the invention will now be described with reference to the following drawings wherein.

DETAILED DESCRIPTION OF EMBODIMENTS

Figures 1, 1A:
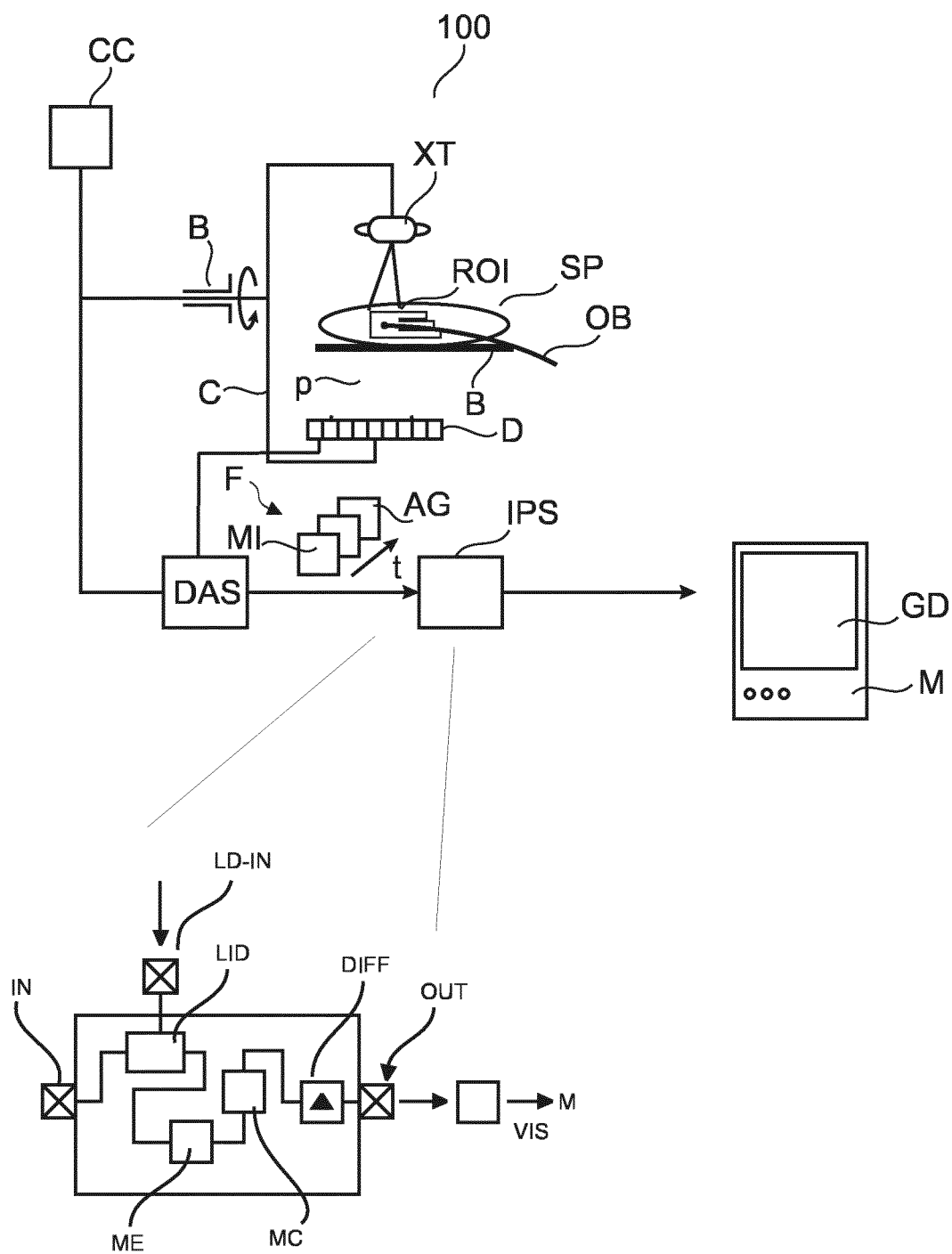
FIG. 1 shows an imaging arrangement.

With reference to FIG. 1, the basic components of a fluoroscopic or angiographic imaging arrangement are shown that can be used to support interventional procedures.

A patient SP may suffer from a malfunctioning heart valve. During a TAVI interventional procedure, medical personnel introduces a guide wire into the femoral artery of patient SP and then guides a delivery catheter OB to the diseased aortic valve ROI to be repaired or replaced As guidewire progresses through patient's P cardiac vasculature, a series of sequential fluoroscopic images F are acquired by an x-ray imager 100. Another example is an embolization procedure where a catheter OB for embolization agent administration is guided to an AVM or cancer (as in TACE) site.

During the intervention, patient SP is deposed on a bed B between an x-ray imager 100's x-ray tube XT and detector D. X-ray tube XT and detector D are attached to rigid frame C rotatably mounted on a bearing B. The fluoroscopic image operation is controlled from a computer console CC. The interventional radiologist can control via said console CC image acquisition and can "shoot" a run of individual fluoroscopic frames ("fluoros") F by actuating a joy stick or a pedal. According to one embodiment, imager 100 is of the C-arm type but other systems are also envisaged.

During image acquisition X-ray radiation emanates from x-ray tube XT, passes through the ROI, experiences attenuation by interaction with matter therein, and the so attenuated beam p then strikes detector D's surface at one of plurality of detector cells making up detector D. Each cell that is struck by a beam responds by issuing a corresponding electrical signal. The collection of said signals is then translated into a respective digital value representative of said attenuation. The density of the material making up the ROI determines the level of attenuation with high density material causing higher attenuation than less denser materials. The so registered digital values for each x-ray p are then consolidated into an array of digital values forming a fluoro frame for a given acquisition time and projection direction. In other words each fluoro is a digital image of a projection view along a projection direction and said direction is determined by the rotation of the C-arm at the given acquisition time or instant. The series of fluoros F are then digitally processed by data acquisition unit DAS and are then forwarded to an image processer IPS whose purpose and operation will be explained in more detail below.

In one embodiment detector D is a component of an image intensifier that directly projects the imagery on a screen M for real-time observation.

In the fluoroscopic image F it is in general only high attenuating objects whose footprint is discernible. More particularly, it is only the guidewire or catheter OB made of a high opacity material that is visible as a projection view footprint or "shadow" in each fluoro F. As the stream of fluoroscopic images F are acquired at a sufficient frame rate (of about 15 images per second for TAVI or 2 images per second for TACE) so that the progression of the guidewire with the catheter OB through the patient SP's body can be monitored.

In some interventions, to enhance contrast for soft tissue or to image fluid dynamic behavior as in the assessment of valvular regurgitations, a high opacity contrast agent ("dye") is delivered to patient SP. A quantity of contrast agent ("bolus") then travels with the blood flow through the vasculature and eventually pass the ROI. In other words, the dye or contrast agent furnishes temporal opacity to the otherwise invisible vascular structure ROI and the vascular tree emerges as a spider like footprint in each of the angios AG. The fluoroscopic frames of the ROI are acquired whilst the bolus is on its way to the ROI and at one point, when the bolus passes through the ROI, one obtains fluoro frames at higher contrast. These specially timed fluoros are the angiograms. In other words, the stream of fluoroscopic frames F comprises two types of frames: the ones acquired without there being contrast agent present at the ROI (this is the default but in this context we will refer to these "no-dye" frames as "mask images" MI) and there are the frames acquired whilst there is contrast agent present at the ROI. Those are the angiogram frames or "contrast images" AG. Instead of contrast agent, the embolization agent may be and above remarks on the timing of mask and contrast images applies accordingly. Whether contrast agent or embolization agent or any other material is being used, the same term "contrast image" is being used.

The imaging system is capable of supporting not only the guiding of the respective medical tool OB (such as the catheter, the valve to be implanted, etc.) to the ROI but also the actual interventional task at the ROI such as the embolization, the cardiac valve repair or any other diagnostic or assessment procedure. For instance, in the embolization intervention the task is to discharge a volume of embolization agent (hereinafter referred to as a "blob of glue", "embolus" or simply the "blob") through the catheter system at the ROI. Said ROI is for example a shunt of a vessel that needs to be occluded because patient needs to undergo AVM, arterioveneous fistula (AVF), or Hemangioma treatment. Examples of liquid embolization materials are Onyx® (a glue-like substance), alcohol, or n-butyl cyanoacrylate (NBCA). Embolus administration commences at instant $t_0$ by releasing a volume of embolization agent via an open tip of said catheter near the ROI. Embolus then circulates in the bloodstream until it lodges in at a target position (usually a shunt linking the arterial to the venous systems), thereby occluding the blood vessel.

Other interventional procedures include cardiovascular repair interventions, for instance the assessment of regurgitations in native or artificial heart valves. In this case the ROI may be taken to be the site of the implanted artificial valve.

To yet further increase image contrast in the angiograms AG and to remove attenuation contributions from back- or foreground objects and other clutter, DSA is used where, conventionally, a mask image MI (a fluoro where no or only negligible contrast agent is present at the ROI) is subtracted from a current angiogram (also referred herein as contrast image) to produce a (pixelwise) difference image DF1. Unfortunately, there is frequently motion during the acquisition of the fluoros/angiograms caused for instance by patient motion such as physiological activity (respiratory and/or cardiac). This has the effect that image objects (for instance those representative of the ROI and the respective projection footprints of the catheter or other tool OB and/or organs e.g., ribs, etc.) undergo an apparent motion across the frames. Simply subtracting the frames from each other when motion occurred may lead to the introduction of artifacts.

For better image-support of such or similar interventions, especially during motions, the system further comprises an image processor configured to act on the fluoroscopic image stream as furnished by the X-ray imager. Inset FIG. 1A shows details of the image processing system IPS as proposed herein.

The IPS includes input and an output ports IN, OUT. There is a landmark identifier module LID, a motion estimator ME, and a motion compensator MC. These modules process different frames of the fluoroscopic image stream in a manner to be described in more detail below with reference to FIGS. 2 and 3 and pass on the so processed frames to a subtractor module DIF to produce a difference image DIF1 to so effect the DSA. The difference image DIF1 is then output at the output port OUT and may be then stored for further processing or may be passed on to a visualizer VIS which interacts with the video equipment of the imaging system 100 to produce a graphics display GD on the display unit M (such as a monitor or screen) where the difference image DIF or parts thereof is then displayed.

Briefly, the proposed image processor system acts as a contrast boost so as to increase the image contrast only at the part of the image that represent the ROI. The image processor IPS proposed herein essentially acts as a localized motion compensating DSA module. The invention proposes an optimized subtraction focusing on the ROI around a distinct landmark in the image only. The landmark may also be outside the ROI so long as there is a known deterministic relationship between the landmark motion and the ROI. The landmark may either be a foreign object, such as a catheter OB tip or any other previously introduced/implanted device such as a heart valve, or partly embolized tissue or the embolus itself. A dedicated algorithm processes the images and is able to follow the landmark in subsequent images. The more structural salience the landmark affords, the easier and more robust its detection across the frames. Then the IPS performs a subtraction that correctly motion compensates for the local region of interest only (in general, but not always the region around the landmark). The rest of the image may thus have significant subtraction artifacts. However artifacts in image portions that do not represent the ROI appear not to matter in some interventions since information in those image portions is of much less relevance. More particularly, the image processor IPS operates to compensate motions in one or more motion layers experienced by the landmark considered. "Motion layers" refer to the phenomenon in projection images, where some image objects appear to move across different frames whereas other image objects do not or appear to move differently such as for instance background image objects. These objects can hence be said to be situated in different motion layers. Although the present method is capable of handling multiple landmarks in the region of interest, these are processed separately to produce for each their dedicated motion compensated difference image DF1.

Operation of image processor IPS will now be explained in more detail below with reference to flow charts in FIG. 2 and FIG. 3, each showing different embodiments.

Figure 2:
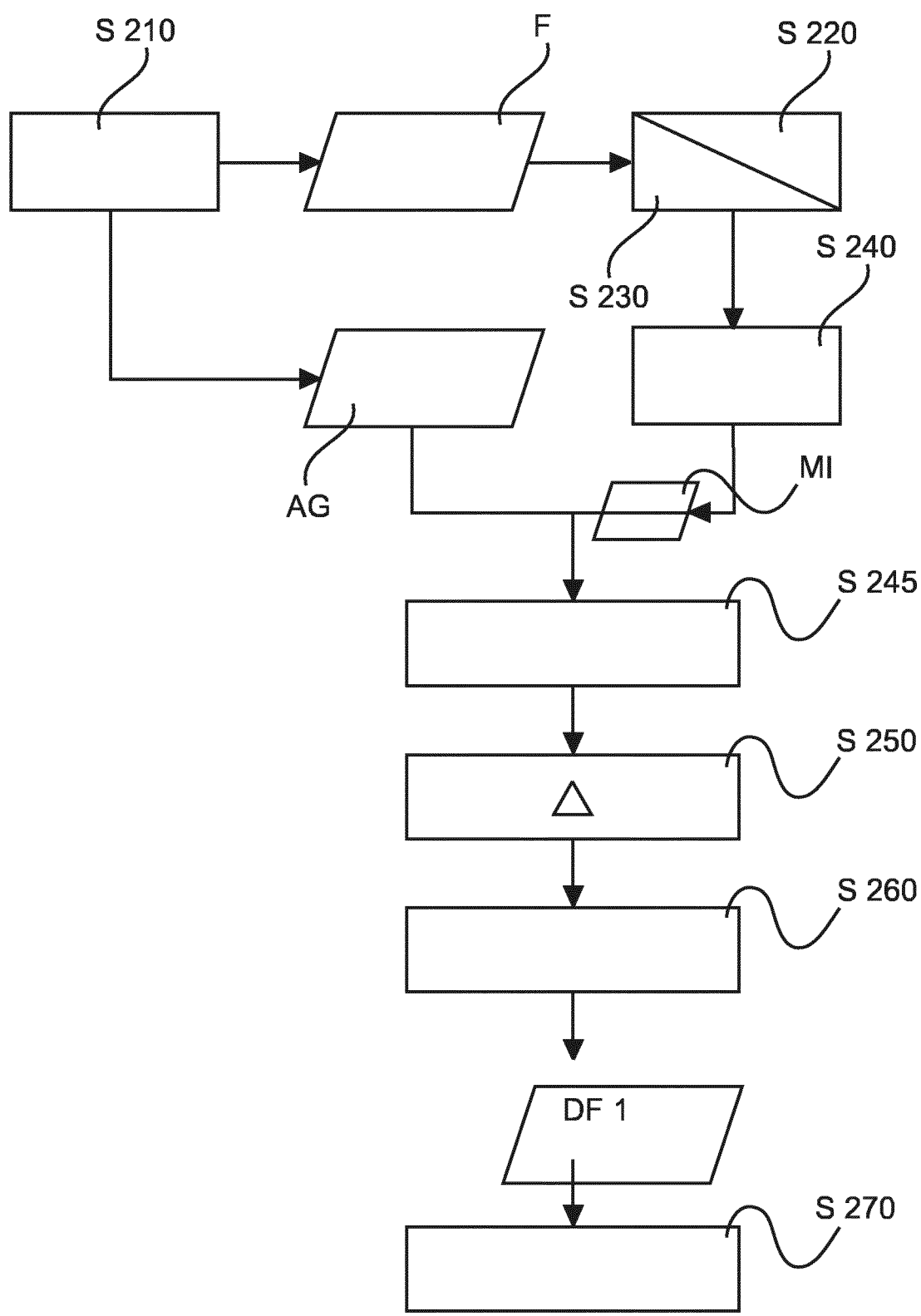
FIG. 2 shows a flowchart of an image processing method according to a first embodiment.

Turning now first to the FIG. 2 flow chart, where operation of the image processing system IPS is explained for motion compensated DSA with respect to a single motion of the considered landmark OB. For instance, but this is for exemplary purposes only and in no way limiting, a first motion may be induced by cardiac activity whereas a second motion induced or driven by respiratory activity may be suppressed by using a breath hold protocol as is assumed herein. In FIG. 3 below a different embodiment will be described capable of handling combined motions. Again, motions other than cardiac or respiratory in particular non-cyclic ones, may be considered herein by extension and are specifically envisaged herein.

At step S210 a mask image frame, MI and a contrast image frame (angiographic frame) AG is picked up from the fluoroscopic image stream F. This can be achieved for instance by using a thresholding scheme that monitors grey level intensities at individual pixels in each of the frames of the fluoroscopic stream. It can then be decided whether the currently received fluoroscopic frame is an angiogram AG, for instance.

On these two or more image frames AG, MI a motion analysis is performed at steps S220 and S230. More particularly, at step S220 a landmark (for instance the footprint or image shadow) of the introduced object OB is detected or identified in the two images MI and AG. Examples for suitable landmarks are the catheter's tip (through which for instance the embolus is administered), the shape and absorption signature of the embolus itself currently deposited at the region of interest, or the shape signature of an implanted device, for example a heart valve for cardio-surgical applications. However native objects such as ribs, calcifications or other identifiable organs are also considered suitable landmarks. It may also be noted that the landmark may not necessarily be situated in the region of interest although this may be true for some cases. All that is required is that there is a deterministic a priori known relationship between the motion of the region of interest and the motion of the observed landmark. In other words, in some embodiments, the motion of the landmark is taken as a surrogate for the motion of ROI. Once the landmark motion has been detected, the related motion of the region of interest can thereby be computed by this known dynamical relationship. The landmark identification step 220 is essentially a tracking operation across the two images MI and AG. If multiple landmarks are identified per image, each landmark is tracked or "followed" separately. Once the landmark has been identified across the two images, the flow control passes on to step S230 where a motion of respective objects OB is estimated from the landmarks identified across the two images.

Flow control then passes on to step S240 where essentially a registration is performed in respect of the estimated motion. More particularly the proposed registration is only in respect of the motion of the region of interest and/or landmark considered. No other motion or any other part of the image is taken into consideration according to one embodiment. This allows the ROI focused motion compensation characteristic of the proposed image processor IPS. The ROI focused motion compensation scheme at step S240 may include rigid or non-rigid registration schemes such as warping or others that allow registering the two landmarks onto each other across the two images MI, AG. One of the considered images MI, AG is then modified for instance shifted or otherwise transformed to effect essentially an alignment of the two images thereby compensating the motion in the considered motion layer as per the landmark motion. A plurality of landmarks for one ROI may be considered in one embodiment to obtain a non-rigid registration. For the non-rigid case, a transformation (a local motion descriptor that is) can be constructed to effectively attempt to morph the given mask image and the contrast image pair into each other. However in some rigid registration embodiments the motion descriptor may be as simple as a single shift/translation vector or a simple rotation.

In an alternative embodiment, the registration step at S240 includes a selection step that selects, in a targeted manner, the mask image from the plurality of previously received masked images so that the motion phase of the landmark (or, if the motion is non-cyclic, the landmark position) as recorded therein corresponds to the motion phase of the landmark as per the current contrast image AG.

For instance, a set of mask image frames can be acquired prior to the arrival of the contrast bolus at the considered region of interest. A "stockpile" of mask images is thereby acquired, each capturing the landmark at a different cardiac phase. These mask images are recorded throughout an entire cardiac cycle. In the registration step, the landmark position/configuration in the later acquired contrast image is then compared with each of the landmark position in the stockpile of the previously recorded mask images to pick the one that best corresponds to the current landmark position as per the contrast image AG. For instance, this selection may be achieved by superimposing the current contrast image with each of the buffered masks MI, to establish where the largest overlap between the landmarks occurs. For instance, the respective locations of the footprints of the implanted heart valve may be used in this cardio context. But this may also be helpful in the embolization example, as the bolus is known to change shape rather slowly as it cures up so a sufficiently high frame rate may allow tracking the cardiac or respiratory or any other motion of interest one wishes to compensate for.

In other words, in one embodiment, the latest (that is, most up to date) mask image can be picked up from the fluoroscopic stream F and is then registered onto the current contrast image by transformation based on the detected landmark motion. In the other embodiment where registration is by selection, the selected mask image may not necessarily be the latest one but may be an older frame from the stream F because the mask image is selected so that the landmark's position captured therein is essentially the same as the landmark position in the current contrast image. One may therefore have to go back a few frames to find the mask of best fit. However, even when so selected, some residual motion mismatch of the landmark as per the two images may still remain and this can be corrected for at optional step S245 by suitable pixel shift algorithm. In one embodiment however there is no such optional step and the registration relies solely on the registration achieved by selecting from the previously recorded mask images the "right one", that is the one that corresponds best in terms of landmark position to the landmark position as per the current contrast image. The optional step S245 may include instead of or in addition to pixel shifting, a filter operation in order to filter out parts of the landmark. For instance, the footprint of the landmark at least in the mask image can be smoothened or removed entirely so as to further pre-empt artifacts in the difference image DF1. It may be appreciated herein that the selection step to ensure correspondence of the landmark motion phase as recorded in the two images is done entirely on image information. In other words, gating technologies that need to resort to external equipment such as ECG etc. can be entirely eliminated herein. However, that is not to say that the proposed method cannot be used in conjunction with gating signals and such a combination is also envisaged herein in an alternative embodiment.

The two images so registered at step S240 are then forwarded to step S250 where the current contrast image is subtracted from the mask image MI to obtain the difference image DF1.

The difference image is then output at step S260 and made available for further processing such as displaying which is affected at step S270. Various modes of displaying will be explained in more detail below with reference to FIG. 4.

Figure 3:
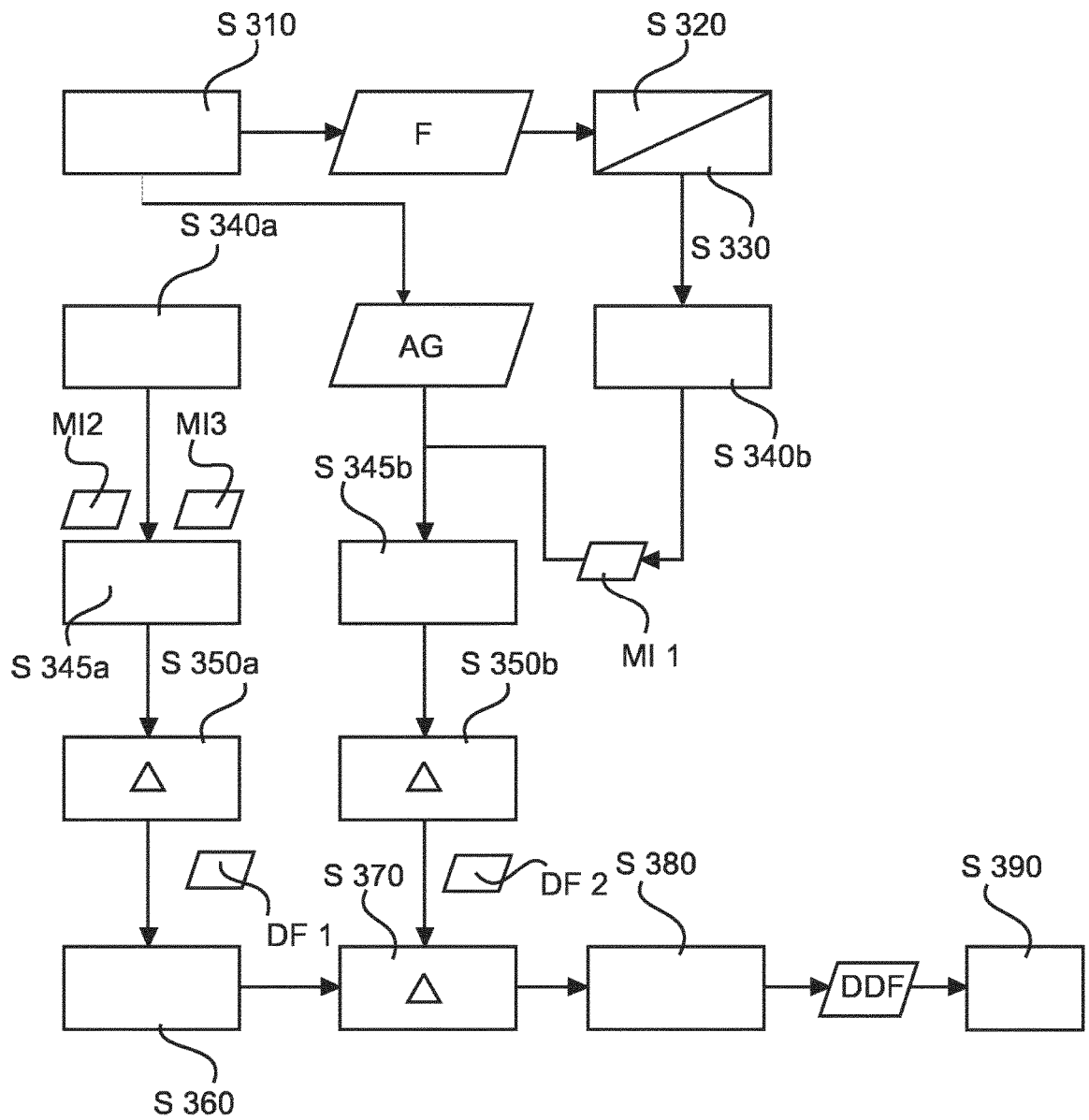
FIG. 3 shows a flowchart of an image processing method according to a second embodiment.

Reference is now made to the flow chart of FIG. 3 which shows a similar DSA algorithm as the one in FIG. 2 however the embodiment in FIG. 3 is adapted to handle motions stemming from a combination of different motions or cycles that act on the region of interest/landmark. Compensation of these combined motion patterns is achieved by a double subtraction scheme.

Briefly put, it is proposed in the FIG. 3 embodiment to perform a first subtraction at step S350b so as to compensate say for the breathing motion and also to perform in a second stream a second subtraction Step S350a so as to remove residual cardiac motion.

More particularly, similar to the method in FIG. 2 at Step S210 the mask image MI and the contrast image AG are received. Similar to the above at steps S220 and S230, a motion analysis is performed, where Step S320 and Step S330 corresponds to steps S220, S230 above.

Based on the analyzed motion at step S340B the two images are registered onto each other similar to above step S240, as a selection or look-up operation where the received mask image is one that has been so selected from the plurality of previously stored (e.g. buffered) mask images. However, in variance to registration step S240 in FIG. 2 above, the selection now focuses at step S340b on the respiratory motion only. This can be done by following in the motion analysis steps S320, S330 landmarks which are more prominently affected by respiratory motion such as the ribs. The cardiac motion component is negligible for these landmarks. Alternatively, a temporal analysis can be carried out to so identify via a unique frequency signature the two motion cycles.

After an optional filtering step S345B to remove residual motions in case registration was attempted by selection, the first difference image DF1 is formed at step S350B.

In parallel to those steps or in sequence thereto at step S340A two other mask images MI2, MI3 are so selected that each record the landmark at a similar breathing phase, however in addition to this motion, the motion stemming from the second motion cycle (in particular the cardiac activity) is considered as well. More particularly, the two mask image references MI2 and MI3 are so selected so that their cardiac phase difference is similar to the cardiac phase difference between the other two images at step S340b, that is, the phase difference (if any) in the current contrast image AG and mask image MI1.

At step S345A which is also optional just like phase S345B a filter and/or residual motion correction is applied as has been previously explained in FIG. 2.

A second difference image DF2 between the two mask reference frames MI3 and MI2 is then formed in Step S350A to arrive at a second difference DF2.

At step S360 the two difference images are registered onto each other by using for instance the position of the landmark in the two difference images, for instance the position of the implanted device, e.g. the heart valve. The two motion compensated/registered difference images DF1, DF2 are then subtracted from each other at step S370 to form a "difference-of-difference" or cascaded difference image DDF which is output at step S380 and made available for further image processing or displaying at Step S390, on which more below at FIG. 4.

It should be understood that although the steps in FIGS. 2, 3 have been explained with occasional reference to cyclic motions, this is according to one embodiment only and both and application of the proposed methods to non-cyclic motion(s) are likewise envisaged herein.

Although the FIG. 3 embodiment has been explained for a motion pattern formed from two motions (that is, caused by respective drivers), this can be extended to three or more motions by iterative application of the FIG. 3 embodiment. That is, one starts with two motions and proceeds as described. To take care of, say, the third motion component one then choses a fourth and fifth mask image at step S340A and proceeds accordingly.

Although the methods at FIGS. 3, 4 have been described with reference to one landmark and one ROI, this again can be extended to handle multiple landmarks, where the images are processed separately and in isolation in respect of each landmark motion.

Optionally, the above methods as per FIG. 2 or 3 may also include an additional masking step based on 3D segmentation of the region of interest to as to further boost visibility/contrast at a sub-portion of the region of interest considered. For instance, in the exemplary embodiment about assessing regurgitation in the left ventricle, this further masking can be achieved by registering the valve position based on 3D segmentation so that everything outside the left ventricle is masked. Evidently this double masking can also be applied in applications other than cardiac surgery.

Figure 4:
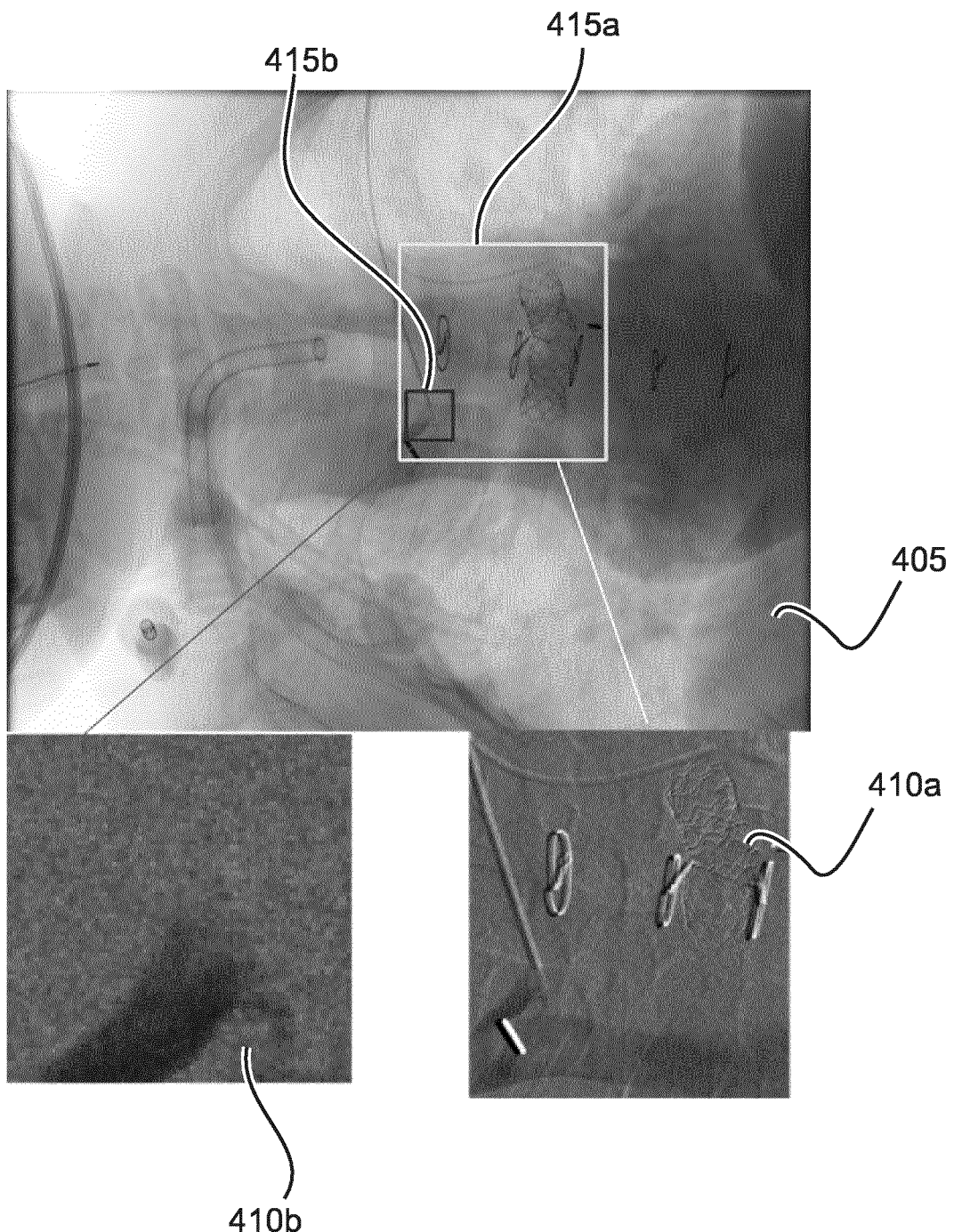
FIG. 4 shows a graphics display according to one embodiment.

Reference is now made to FIG. 4 to illustrate various display modes for the one or more difference images. According to some embodiments the whole of the difference image is displayed on monitor M. In one particular advantageous embodiment is shown in FIG. 4 it is only a true sub-part or "clipping" of the difference image that is displayed in a dedicated view port 410AB on screen together with a current fluoroscopic frame in 405. In other words, in the ROI dedicated view ports only the ROI part of the difference image is being displayed.

The region of interest itself is shown by means of respective graphical overlays for 415a,b overlaid on a current frame 405 outlining the respective image portions for each ROI. The current frame 405 may be a mask image, or the current contrast image AG or it may be a conventional DSA without motion compensation. In the later case, one may think of the large viewport 405 to afford a global DSA view whereas the one or more smaller viewports 410a,b afford the respective, local, ROI focused motion compensated DSA views. In other words, in each viewport a section of the respective difference image DF is displayed, the section being defined by the position and size of the respective ROI representing graphical overlay 415a or 415b.

As shown in FIG. 4A, the two image portions outlined by overlays 415a,b for the different, local ROI) may overlap. The difference images for the respective, discrete ROIs as represented by the graphical overlays 415a,b are computed separately and, as far as motion is considered, in isolation, for each ROI with consideration only for its own respective motion as per the respective landmark. As can be seen, for each ROI as represented by overlay 415a,b, a different landmark has been used to capture the respective ROI motion. For instance, for ROI overlay 415a the landmark is the footprint of the stent whereas for ROI overlay 415b the relevant landmark is the footprint of the catheter tip.

In one embodiment, the locally motion compensated ROI images are displayed in the respective view ports 410AB in zoomed up versions.

In other embodiments it may be advantageous to only show the regions of interest so the current underlying frame 405 is not shown.

In one embodiment, auxiliary, additional image sources such as CT, MRI or other 3D imagery can be used to support landmark selection in 3D. The image source is then registered onto the projection image MI, AG and the 3D landmark is then projected onto the projection image to so define the footprint of the 3D landmark thereby enabling the previously described motion compensation operation. The auxiliary imagery may not necessarily be 3D however in all embodiments, e.g. 2D auxiliary 2D imagery to support landmark selection is also envisaged. In such an instance where auxiliary imagery has been used in this way, relevant image information from the auxiliary imagery may be overlaid as graphic overlays onto the sub-section of the difference image displayed in the respective dedicated DSA view port 410*a,b*. In addition, or instead the auxiliary imagery may be displayed as an overlay at the respective ROI location in the current overview frame 405.

The above described view display modes with respect to FIG. 4 can be used for any of the methods according to FIG. 3 and FIG. 2 described. In other words, the view ports 410*a,b* show either a section of the difference image, as per FIG. 2, or of the double difference image as per FIG. 3. Although FIG. 4 illustrates two local view ports it will be understood that the described display mode can used for any number of view ports including a single local view port.

In terms of user interaction support the proposed system may also include a functionality that automatically detects suitable landmarks and it is those landmarks from which the user can then choose. In this way it is ensured that landmarks are visible across all images so there is no need to resort to external imagery. In addition or as an alternative, the user is able to select the desired landmarks/and or outline the ROI overlays in the auxiliary imagery, such as in a 3D CT image volume and these are then mapped onto the projection images MI, AG based on the projection direction used by the projection imager 100.

In one embodiment, if methods of FIG. 2 or FIG. 3 are applied to a plurality of landmarks, the landmarks displayed for the user to choose from are selected by the system so as to yield a least overall registration error. In other words, in this embodiment when the landmarks are automatically suggested, the system pre-computes in the background the respective registration errors for a given contrast image and mask image pair. More specifically, the selection of the number (within a certain range, and with a certain penalty as this number increases), location and size of the landmarks for independent motion compensation is achieved automatically so as to minimize the total registration error. This total registration error can be quantified by using the respective, individual vector fields as established in the respective ROI estimations at steps 220 and 240. In one embodiment, this error quantization is realized by clustering an error map of a dense and local motion estimation technique (such as optical flow or Block-Matching-Algorithm) prior to optimum finding. However, it is to be understood that even in this embodiment where a common registration is considered, the actual motion compensation for each of the ROIs are still restricted to consider only the respective motion for the landmark associated with that ROI. In other words, the motion compensations for each DSA operation are executed separately in isolation from each other so that each difference image is only optimized for one specific ROI/landmark motion.

Further, in terms of user interaction, the proposed method may include a drag and drop scheme in which the user selects by mouse click or touch screen action the respective ROI and/or landmark and then drags same in a swipe touch screen action or mouse-click-and-drag operation across the screen towards and onto the respective view port. The so designated landmarks are then feed into the IPS through landmark feed input port LD-IN. This user interaction will then trigger the computation as per FIGS. 2 and 3 above. In another embodiment, the IPS is fully automatic, that is, the landmarks are automatically identified and selected and processed as per FIGS. 2, 3 without any user input. In the alternative, manual embodiments are also envisaged where there are no automatically selected ROIs/landmarks suggested to the user and the user is free to input any.

In one embodiment, the user can select separately the region of interest itself by drawing for instance suitable neighborhoods in terms of circles or squares as is shown in FIG. 4 or by drawing any other suitable geometric shape. This defines the size or "reach" of the ROI as an image neighborhood. In some cases the landmark is then automatically co-defined if the landmark happens to be inside the outlined ROIs. If the landmark is outside the ROI, the landmark can be logically linked with the ROI by allowing for a separate operation to associate with each ROI the respective landmark whose motion is to be used to achieve the motion compensated DSA operation for the respective ROI. For instance, a double click scheme may be used to define ROI and landmarks separately, but in pairs by a predefined synchrony in user interaction steps. For instance, the user first defines the ROI by drawing out, say, the ROI defining square. The user then clicks on a location outside the ROI, and the system interprets this second location as the landmark to be associated with the just outlined ROI for the purpose of surrogate motion estimation. This ROI-with-landmark association feature can be implemented by suitable counter and event handler schemes.

It will be appreciated that the above described operations in FIGS. 2 and 3 and the display operations in FIG. 4 can be executed in real time that is whilst the image frames in fluoroscopic stream are received at the respective ports IN. However, an off-line mode is also envisaged where the respective compensation operations as per FIG. 2 or 3 can be done performed previously acquired image or can be done in review mode. Although the above method has been explained at specific examples in terms of cardiac intervention such as aortic valve regurgitation assessment or embolization procedures it should be understood that the present application can be put to good use in any interventional procedures where digital subtraction operations are called for. Also, the present application is not restricted to merely support interventional surgical procedures. Other image-reliant applications of other fields such as geology or examination of radar imagery, etc. are also envisaged herein.

Figure 5:
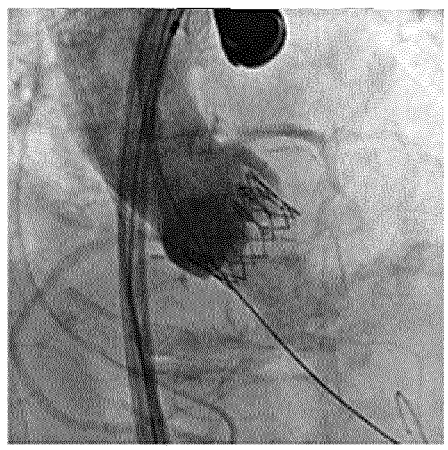
FIG. 5 shows illustrative imagery as produced according to an image processing method as proposed herein.
Figure 5:
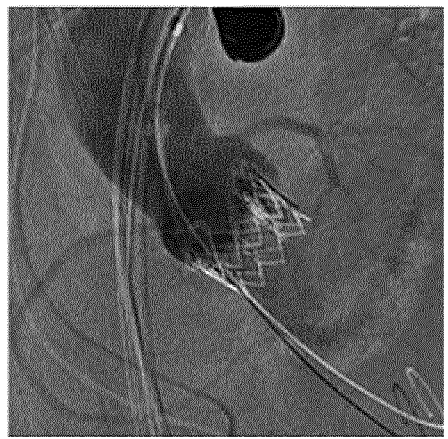
Figure 5:
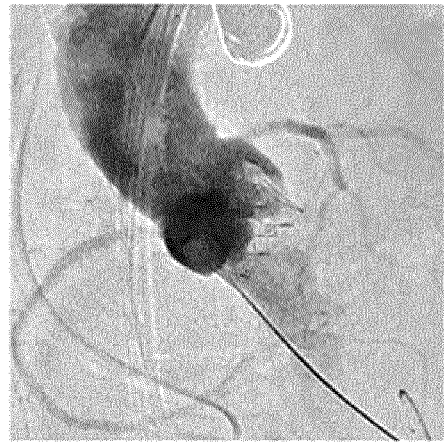

With reference to FIG. 5, this illustrates exemplary imagery output as per the method described above and compared with conventional approaches. The images show the respective footprint/radiation shadows of an artificial heart valve after deployment. Pane A shows a conventional angiogram, pane B shows conventional subtraction of the angiogram using the latest available mask frame, and pane C shows the result as per method of FIG. 2 using the artificial heart valve as landmark. There are fewer artifacts, especially close to the aortic valve. The regurgitations in the ventricle (appearing below the implanted valve) are then easier to assess.

The image processing module IPS may be arranged as a software module or routine with suitable interfaces to read in the fluoro stream F and may be run on a general purpose computing unit or a dedicated computing unit. For instance, processor IPS may be executed on a workstation or console CC of the imaging system 100. The image processing module IPS with some or all of its components of may be resident on the executive agency (such as a general purpose computer, workstation or console) or may be accessed remotely/centrally by the executive agency via a suitable communication network in a distributed architecture.

Alternatively, the components of the image processing module IPS may be arranged as dedicated FPGAs (field-programmable gate array) or similar standalone chips. The components may be programmed in a suitable scientific computing platform such as Matlab® or Simulink® and then translated into C++ or C routines maintained in a library and linked when called on by the executive agency such as the general purpose computer, workstation or console.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing system, comprising:
an input port configured to receive at least two projection images including at least one mask image (MI) and at least one contrast image of at least part of a specimen with an object therein, the mask image and the contrast image acquired at different acquisition times and each representing a region of interest, ROI, at different contrasts;
a landmark identifier configured to identify at least one landmark of said object in the contrast image and in the at least one mask image;
a motion estimator configured to estimate a motion of the object as per a motion of the identified at least one landmark across the at least contrast image and the at least one mask image, wherein said motion relates to a motion of the ROI;
a motion compensator configured to register the at least one mask image with the at least one contrast image based only on the estimated landmark motion;
a subtractor configured to subtract the at least one registered mask image from the at least one contrast image to obtain a difference image of the ROI; and
an output port configured to output the difference image.

2. Image processing system of claim 1, comprising a visualizer configured to display on a display device at least a part of said difference image that corresponds to the ROI.

3. Image processing system of claim 2, wherein the visualizer is configured to effect display on the display device of the at least part of the difference image together with the mask image and/or the contrast image.

4. Image processing system of claim 1, wherein the landmark identification is based on auxiliary image data registered with at least one of the projection images.

5. Image processing system of claim 1, wherein the landmark is subject to a first motion, wherein the motion compensator's registering operation includes selecting the mask image so that a position of the landmark as per the selected mask image corresponds to a position of the landmark as per the at least one contrast image.

6. Image processing system of claim 5, comprising a landmark specification input port and the identifier operates to identify the landmark in response to receiving at said input port a specification of the landmark or of multiple landmarks, the specification being a selection from the mask image or from the contrast image.

7. Image processing system of claim 5, wherein the visualizer is configured to display at least part of the registered auxiliary image data.

8. Image processing system of claim 5, wherein the landmark is subject to a combination of two motions, wherein the motion compensator is configured to:

select two additional mask images so that i) the landmark's positions due to the first motion as per the two additional mask projection images are substantially the same and ii) a position difference in respect of the second motion is substantially the same as for the landmark as per the mask image and as per the at least one contrast image.

9. Image processing system of claim 8 wherein the subtractor is configured to:
  subtract said two additional mask images to obtain a mask difference image,
  after motion compensation in respect of the first motion, subtract the mask difference image from the difference image to obtain a cascaded difference image.

10. Image processing system of claim 9, the visualizer configured to display on a screen at least a part of said cascaded difference image.

11. Image processing system of claim 1, wherein the system is configured to process the at least two projection images in respect of a second landmark and/or second ROI to obtain a second difference image wherein the visualizer is configured to display at least a part of said second difference image instead of or together with the difference image.

12. Image processing system of claim 11, wherein the visualizer is configured to display in the mask image, a graphical overlay indicating a location of the ROI and/or of the second ROI.

13. Image processing system of claim 1, wherein the landmark is or relates to a projection footprint of a native object or to a foreign object, in particular an implanted object, resident in the specimen at respective acquisition times of the mask projection image and the projection image.

14. An image processing method, comprising the steps of:
  receiving at least two projection images including at least one mask projection image and at least one contrast image of at least part of a specimen with an object therein, the mask projection image and the contrast image acquired at different acquisition times and representing a region of interest, ROI, at different contrasts;
  identifying at least one landmark of said object in the contrast image and the at least one mask image;
  estimating a motion of the object as per a motion of the identified at least one landmark across the at least contrast image and the at least one mask image, wherein said motion relates to a motion of the ROI;
  registering the at least one mask projection image with the at least one contrast image based only on the estimated landmark motion;
  subtracting the at least one registered mask image from the at least one contrast image to obtain a difference image of the ROI; and
  outputting the difference image.

15. A non-transitory computer-readable storage medium storing a computer program element for controlling a system, which, when being executed by a processing unit, is configured to perform the following steps:
  receiving at least two projection images including at least one mask projection image and at least one contrast image of at least part of a specimen with an object therein, the mask projection image and the contrast image acquired at different acquisition times and representing a region of interest, ROI, at different contrasts;
  identifying at least one landmark of said object in the contrast image and the at least one mask image;
  estimating a motion of the object as per a motion of the identified at least one landmark across the at least contrast image and the at least one mask image, wherein said motion relates to a motion of the ROI;
  registering the at least one mask projection image with the at least one contrast image based only on the estimated landmark motion;
  subtracting the at least one registered mask image from the at least one contrast image to obtain a difference image of the ROI; and
  outputting the difference image.

* * * * *